United States Patent
Chen et al.

(10) Patent No.: US 7,388,758 B2
(45) Date of Patent: Jun. 17, 2008

(54) COMPUTER ENCLOSURE WITH CONNECTING DEVICE

(75) Inventors: Yun-Lung Chen, Tu-Cheng (TW); Yu-Ming Xiao, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 52 days.

(21) Appl. No.: 11/294,121

(22) Filed: Dec. 5, 2005

(65) Prior Publication Data

US 2006/0279184 A1    Dec. 14, 2006

(30) Foreign Application Priority Data

Jun. 8, 2005   (CN) .................. 2005 2 0059822 U

(51) Int. Cl.
*H05K 5/00* (2006.01)
(52) U.S. Cl. ............. 361/801; 361/730; 361/732; 361/683; 361/796; 361/752; 312/223.2; 174/50
(58) Field of Classification Search .......... 361/683, 361/756, 600, 679, 728, 730, 732, 740, 747, 361/759, 752, 796, 801; 174/50; 312/223.2, 312/223.3
See application file for complete search history.

(56) References Cited

U.S. PATENT DOCUMENTS

| | | | | | |
|---|---|---|---|---|---|
| 3,273,951 | A | * | 9/1966 | Miller ....................... | 312/310 |
| 5,036,488 | A | * | 7/1991 | Motarjemi .................. | 365/52 |
| 5,383,138 | A | * | 1/1995 | Motoyama et al. ......... | 361/683 |
| 5,495,389 | A | * | 2/1996 | Dewitt et al. ............... | 361/683 |
| 5,552,957 | A | * | 9/1996 | Brown et al. ............... | 361/683 |
| 5,598,318 | A | * | 1/1997 | Dewitt et al. ............... | 361/683 |
| 5,761,034 | A | * | 6/1998 | Chu ........................... | 361/687 |
| 5,900,848 | A | * | 5/1999 | Haneda et al. .............. | 345/1.1 |
| 5,973,917 | A | * | 10/1999 | White ......................... | 361/683 |
| 6,654,236 | B2 | * | 11/2003 | Chen et al. .................. | 361/683 |
| 6,761,421 | B2 | * | 7/2004 | Chen et al. .................. | 312/223.2 |
| 6,764,146 | B2 | * | 7/2004 | Chen .......................... | 312/223.2 |
| 6,819,551 | B2 | * | 11/2004 | Chen .......................... | 361/683 |

* cited by examiner

*Primary Examiner*—Tuan Dinh
*Assistant Examiner*—Dameon E Levi
(74) *Attorney, Agent, or Firm*—Morris Manning Martin LLP; Tim Tingkang Xia, Esq.

(57) ABSTRACT

A computer enclosure includes a base (10), a cover (30), and a connecting device (40). The connecting device pivotably connects the cover to the base. The connecting device includes a first lever (42), a second lever (44) and a supporting arm (46). The second lever can be stopped by the first lever, for positioning the cover when the cover is in an open position.

4 Claims, 5 Drawing Sheets

COMPUTER ENCLOSURE WITH CONNECTING DEVICE

BACKGROUND OF THE INVENTION

1. Field of the Invention

The present invention relates to computer enclosures, and more particularly to a computer enclosure with a pair of connecting devices.

2. General Background

Generally, a computer enclosure includes a cover for covering an entry through which electronic elements are installed. The cover is often moved relative to the computer enclosure when electronic elements need to be added, replaced, or maintained.

A typical enclosure for a computer includes a base, a cover, and a pivot rod pivotally connecting the cover to the base. The cover has two lower front ends and two lower rear ends. Each of the lower front ends is provided with a button formed with a downwardly extending hook. A power supply is fastened on an inner side of the cover. The base has a bottom having two front corners each formed with a groove adapted to engagingly receive the corresponding hook of the cover. A fixing plate is mounted on an inner rear side of the base, and is provided with two brackets. The pivot rod extends through each of the lower rear ends of the upper cover and the brackets, and the cover is thereby pivotally connected with the base. The power supply is moved away from the base when the cover is opened, thus facilitating mounting of a computer peripheral inside the enclosure. However, the pivot rod is easily worn when the cover is repeatedly used.

What is needed, therefore, is a durable connecting device for pivotally attaching a cover of a computer enclosure to a base of the enclosure.

SUMMARY

A computer enclosure includes a base, a cover, and a connecting device. The connecting device pivotably connects the cover to the base. The connecting device includes a first lever, a second lever and a supporting arm. The second lever can be stopped by the first lever, for positioning the cover when the cover is in an open position.

Other advantages and novel features will be drawn from the following detailed description of a preferred embodiment with attached drawings, in which:

DETAILED DESCRIPTION OF PREFERRED EMBODIMENT

Figure 1:
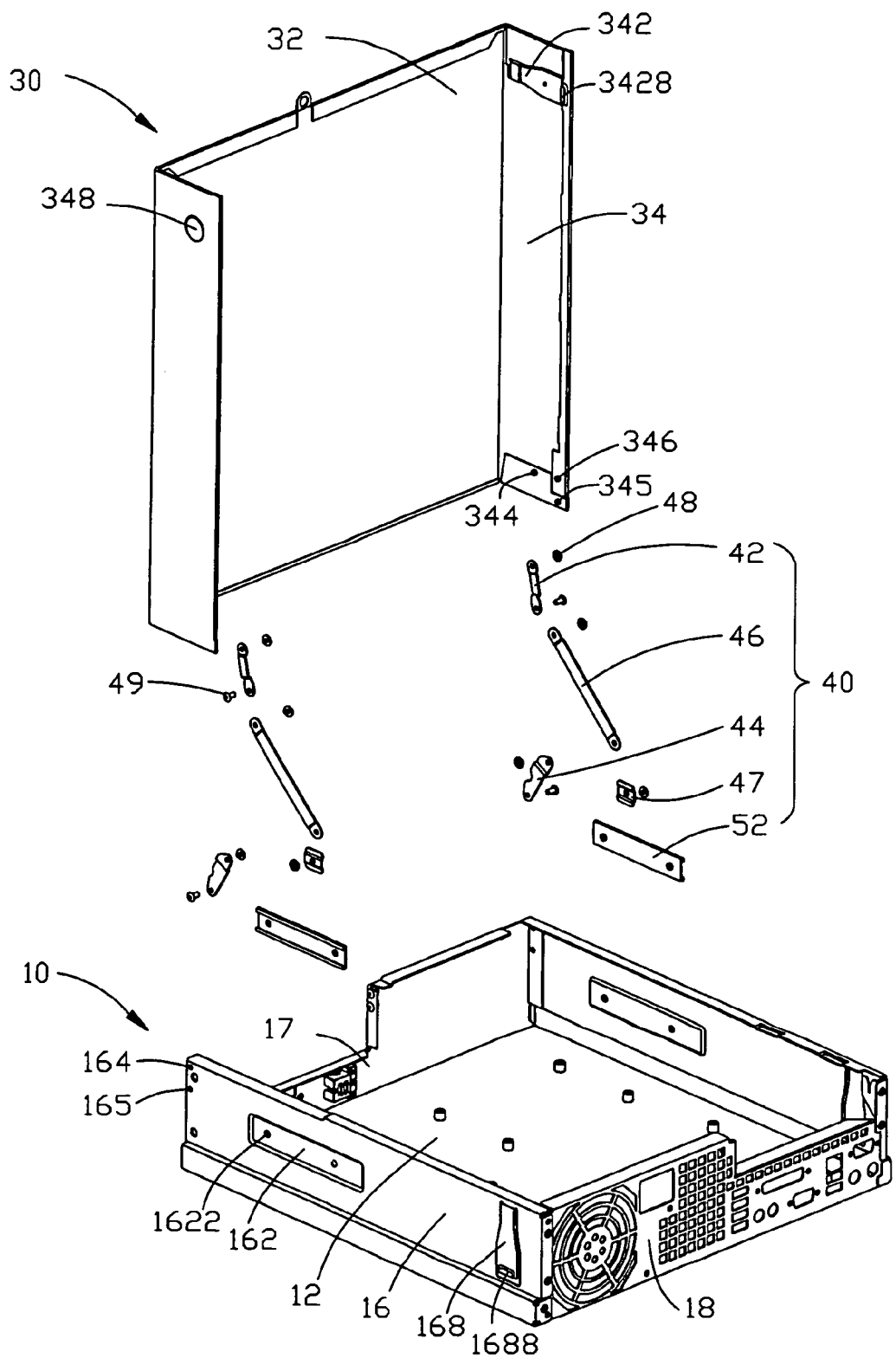
FIG. 1 is an exploded, isometric view of a computer enclosure of a preferred embodiment of the present invention, the computer enclosure including a cover, a base, and a pair of connecting devices.

Referring to FIG. 1, an enclosure of an electronic device like a computer includes a base 10 and a cover 30. The cover 30 is pivotably connected to the base 10 with a pair of connecting devices 40.

The base 10 includes a bottom panel 12, a pair of side panels 16, a front panel 17, and a back panel 18. A recessed portion 162 with two screw holes 1622 is defined in each of the side panels 16. Two pivot holes 164, 165 are defined at a front end of the side panel 16, and a resilient clip 168 is formed at a rear end of the side panel 16. A locking tab 1688 protrudes from a bottom of the resilient clip 168.

The cover 30 is generally U-shaped, and includes a top wall 32, and a pair of side walls 34 extending down from opposite edges of the top wall 32. A resilient locking member 342 is formed on each of the side walls 34, corresponding to a respective one of the resilient clips 168 of the base 10. A locking tab 3428 protrudes from a bottom of the resilient locking member 342, corresponding to the respective locking tab 1688 of the base 10. A pressing portion 348 is formed at a bottom of the locking member 342. Three connecting holes 344, 345, 346 are defined in a front end of each side wall 34.

Figure 2:
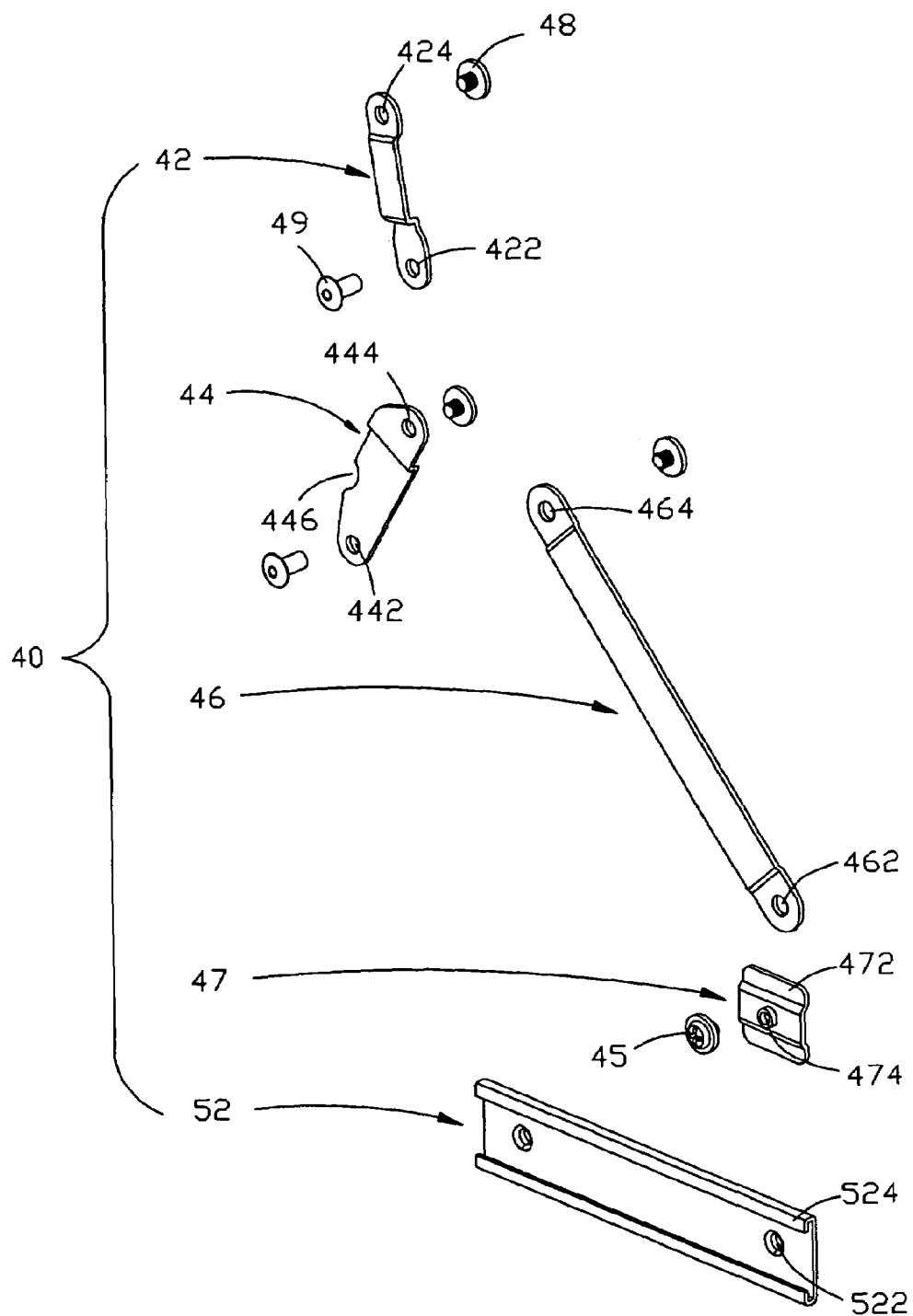
FIG. 2 is an enlarged view of one of the connecting devices of FIG. 1.

Referring also to FIG. 2, each of the connecting devices 40 includes a first lever 42, a second lever 44, a supporting arm 46, a guiding rail 52 and a connecting clip 47. The first lever 42, the second lever 44, and the supporting arm 46 define a pair of pivot holes in opposite ends thereof, labeled as 422, 424, 442, 444, 462, 464 respectively. A cutout 446 is defined in an edge of the second lever 44. The guiding rail 52 is secured in the corresponding recessed portion 162 of the base 10. Two rail rims 524 are formed on opposite longitudinal sides of the guiding rail 52. The connecting clip 47 is adapted to slidably insert into the guiding rail 52. A pair of sliding portions 472 are formed at opposite sides of the connecting clip 47, corresponding to the rail rims 524 of the guiding rail 52. A through hole 474 is defined in the connecting clip 47.

Figure 3:
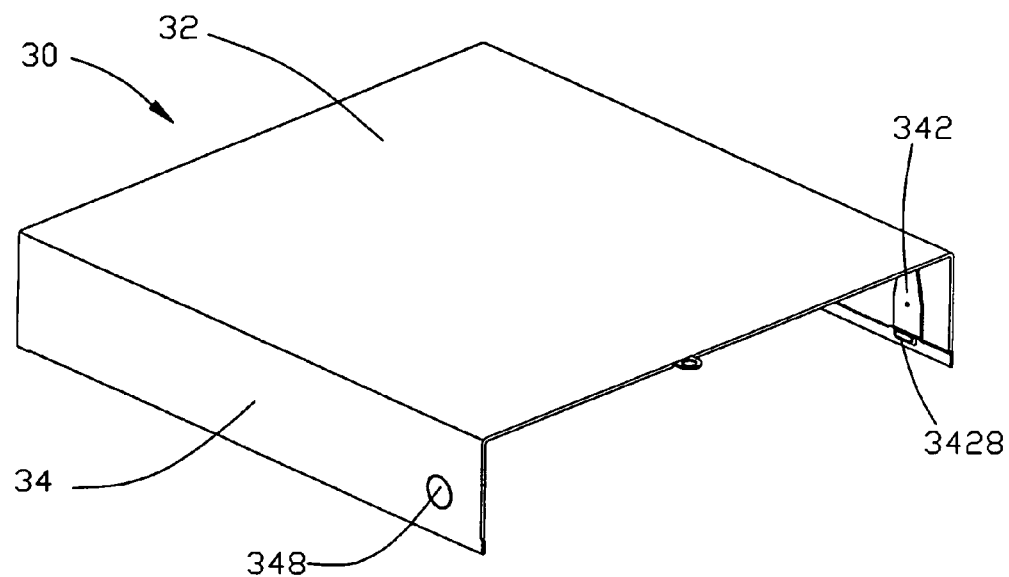
FIG. 3 is similar to FIG. 1, but showing the connecting devices attached on the base.
Figure 3:
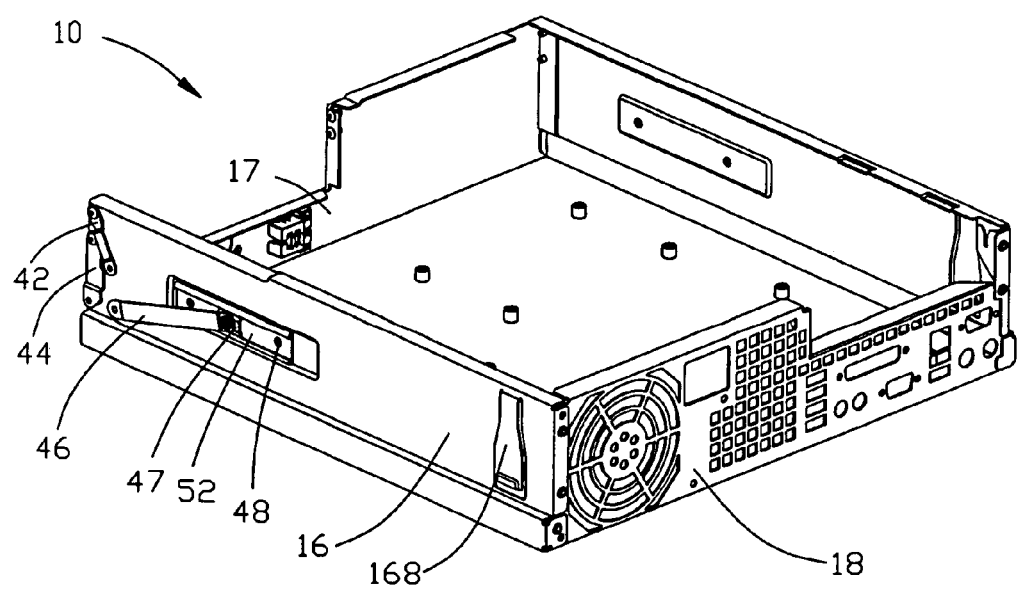
Figure 4:
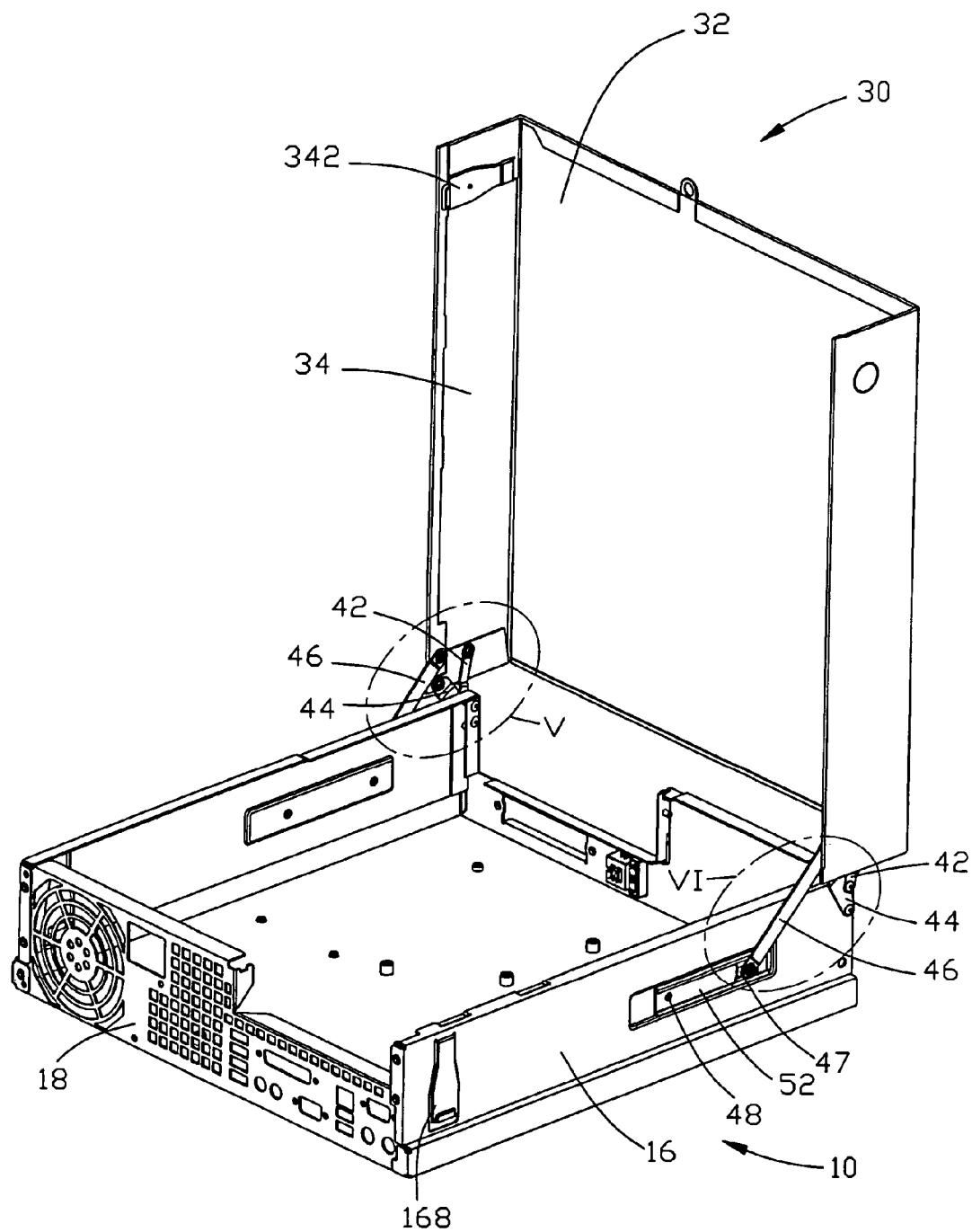
FIG. 4 is an assembled view of FIG. 1, but viewed from another aspect and showing the cover in an open position.

Referring to FIGS. 3 and 4, in assembly of each connecting device 40, first ends of each of the first and second levers 42, 44 are pivotably connected to the base 10, with a pair of pivot pins 49 being engagingly received in the pivot holes 164, 422 and 165, 442. The guiding rail 52 is secured in the recessed portion 162 with a plurality of screws 48. The connecting clip 47 is slidably inserted into the guiding rail 52. A first end of the supporting arm 46 is pivotably secured to the connecting clip 47 with a screw 45. Then opposite ends of the first and second levers 42, 44 and supporting arm 46 are respectively pivotably secured to the cover 30, with three screws 48 being engagingly received in the connecting holes 344, 345, 346. The cover 30 is thus pivotably secured to the base 10 by the connecting devices 40. When the cover 30 is rotated downward, the locking tabs 3428 of the cover 30 engage with the locking tabs 1688 of the base 10, thereby locking the cover 30 to the base 10. Thus the cover 30 is held in a closed position. In this position, the first levers 42 are respectively located between the second levers 44 and the supporting arms 46.

Figure 5:
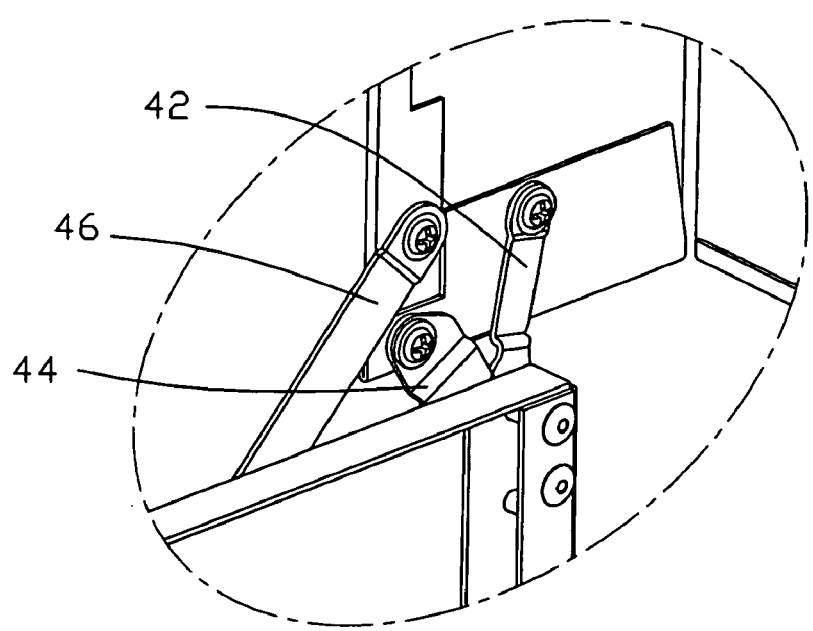
FIG. 5 is an enlarged view of a marked elliptical portion V of FIG. 4.
Figure 6:
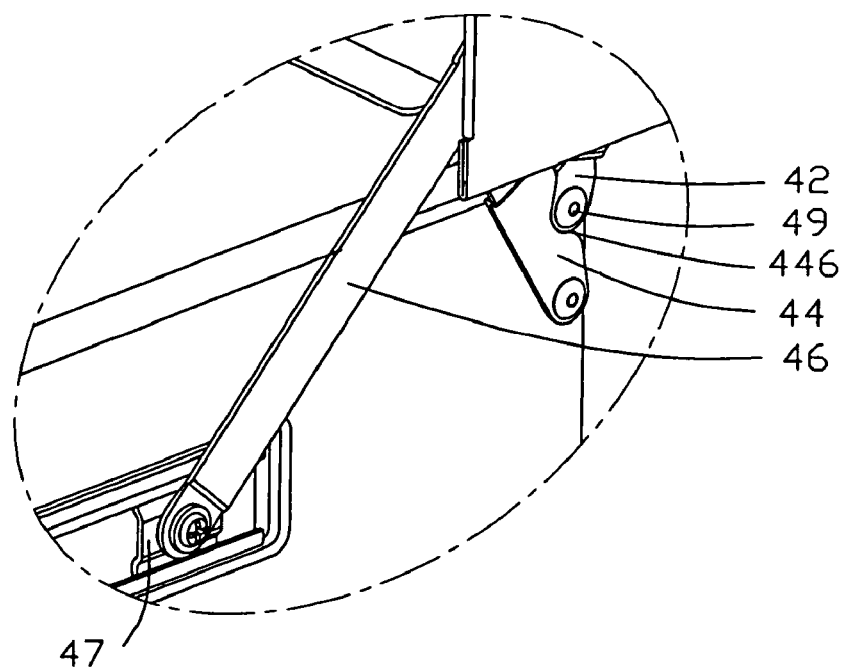
FIG. 6 is an enlarged view of a marked elliptical portion VI of FIG. 4.

Referring to FIGS. 4 to 6, to open the cover 30 of the computer enclosure, the pressing portions 348 of the locking members 342 are pressed inwardly to disengage the locking tabs 3428 of the cover 30 from the corresponding locking tabs 1688 of the base 10. The cover 30 is rotated upwardly. The first levers 42 and the second levers 44 rotate upwardly relative to the base 10 until the second levers 44 are stopped by the first levers 42. The cutouts 446 of the second levers 44 matingly receive bottom ends of the first levers 42. Thus the cover 30 is held in an open position. In this position, the second levers 44 are generally located between the first levers 42 and the supporting arms 46.

It is to be understood that even though numerous characteristics and advantages have been set forth in the foregoing description of a preferred embodiment, together with details of the structure and function of the embodiment, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure, comprising:
    a base;
    a cover; and
    a connecting device connecting the cover to the base, the connecting device comprising a first lever, a second lever and a supporting arm, the first lever and the second lever each being pivotably attached to the base and the cover directly at opposite ends thereof, wherein the second lever is stopped by the first lever when the cover is opened to an open position thereby positioning the cover in the open position;
    wherein the supporting arm is pivotably connected to the base and slidably connected with the cover; wherein a guiding rail is disposed at the base for guiding the sliding of the supporting arm; and, wherein a connecting clip is connected to the supporting arm and slidingly received in the guiding rail.

2. The computer enclosure as described in claim 1, wherein the first lever is located between the second lever and the supporting arm when the cover is in a closed position.

3. An electronic device comprising:
    a base of said electronic device defining an inner space capable of accommodating components of said electronic device therein;
    a cover of said electronic device movable relative to said base between a first position thereof to enclose said space together with said base and a second position thereof to move away from said first position thereof in order for exposing said space to an outside of said electronic device; and
    a connecting device attachably connectable between said base and said cover so as to controllably guide movement of said cover relative to said base, said connecting device comprising at least two levers, each lever connected to said base and said cover directly with opposite ends thereof and capable of performing controllable guide of said connecting device to said movement of said cover, one of said at least two levers capable of engaging with another of said at least two levers so as to supportively position said cover in a selective position of said first and second positions thereof;
    wherein said one of said at least two levers engages with a cutout which is defined at said another of said at least two levers for positioning said cover at said second position.

4. The electronic device as described in claim 3, further comprising a supporting arm attachably connectable between said base and said cover so as to perform another guide to said movement of said cover relative to said base.

* * * * *